[19] United States Patent
Frye

[11] 4,315,046
[45] Feb. 9, 1982

[54] PROCESS FOR SECURING PRIMERLESS ADHESION OF SILICONE RESIN COATING COMPOSITION TO CAST ACRYLICS

[75] Inventor: Robert B. Frye, Albany, N.Y.

[73] Assignee: General Electric Company, Waterford, N.Y.

[21] Appl. No.: 169,651

[22] Filed: Jul. 17, 1980

[51] Int. Cl.$^3$ .............................................. B05D 3/00
[52] U.S. Cl. .................................. 427/322; 427/163; 427/164; 427/387; 427/407.1; 427/412.1
[58] Field of Search ............... 427/387, 301, 322, 307, 427/302, 299, 400, 407.1, 412.1, 444, 412.5, 163, 164, 393.5; 428/412, 447, 451; 260/29.2 M; 156/326

[56] References Cited

U.S. PATENT DOCUMENTS

| | | | |
|---|---|---|---|
| 3,481,763 | 12/1969 | Hider et al. | 427/322 |
| 3,561,995 | 2/1971 | Wu et al. | 427/444 X |
| 3,629,165 | 12/1971 | Holdstock | 260/2.5 AH |
| 3,686,018 | 8/1972 | Lindblom et al. | 427/322 X |
| 3,708,225 | 1/1973 | Misch et al. | 351/160 |
| 3,754,969 | 8/1973 | Greenlee | 427/387 |
| 3,798,225 | 3/1974 | Kreighbaum et al. | 260/286 R |
| 3,976,497 | 8/1976 | Clark | 260/37 SB X |
| 3,986,997 | 10/1976 | Clark | 260/29.2 M |
| 4,159,206 | 6/1979 | Armbruster | 106/287.1 Z |
| 4,177,301 | 12/1979 | Smith, Jr. | 427/401 |
| 4,177,315 | 12/1979 | Ubersax | 428/447 X |

Primary Examiner—Norman Morgenstern
Assistant Examiner—Thurman K. Page
Attorney, Agent, or Firm—Hedman, Casella, Gibson & Costigan

[57] ABSTRACT

Neutral to basic silicone resin abrasion resistant coating compositions can be adherently secured to cast acrylic plastic substrates without a primer if the substrate is provided with a wash coat of glacial acetic acid shortly before being coated with said silicone resin composition.

7 Claims, No Drawings

PROCESS FOR SECURING PRIMERLESS ADHESION OF SILICONE RESIN COATING COMPOSITION TO CAST ACRYLICS

BACKGROUND OF THE INVENTION

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Acrylics, such as polymethymethacrylates, like Plexiglas, are also commonly and widely used glazing.

Attempts have been made to improve the abrasion resistance of these transparent plastics. For example, scratch resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997, 3,976,497 and 4,159,206, for example, describe such compositions.

Copending commonly assigned U.S. application Ser. No. 964,910, filed Nov. 30, 1978, discloses another abrasion-resistant coating composition. This coating composition which is neutral to slightly basic, has been found to be highly desirable as a protective finish for plastic, as well as metal or metallized substrates. A particularly significant area of application for this coating is in the glazing and optical lens industry. Since these areas require a coating of high optical clarity, coatings which show flowmarks, dirtmarks or other marks which may impair visibility, are undesirable.

In copending commonly assigned U.S. application Ser. No. 964,911, filed on Nov. 30, 1978, and now U.S. Pat. No. 4,277,287, it is disclosed that the addition of a small amount of a polysiloxane polyether copolymer to the coating compositions disclosed therein eliminates the occurrence of undesirable flowmarks and the like, as well as providing other improvements in the hard abrasion resistant coating.

In many instances, however, in order to obtain good adhesion of the protective silicone resin coating composition to the substrate, a primer must first be applied to the substrate. This has been found to be especially necessary with cast acrylics, e.g., polymethylmethacrylates, like Plexiglas.

In copending U.S. application Ser. No. 34,164, filed Apr. 27, 1979, it is disclosed that if a solvent comprising a mixture of polar organic solvents miscible with water and alcohol and aggressive to plastic is used in the coating compositions of said U.S. Ser. No. 964,911, U.S. Pat. No. 4,277,287 instead of the dilution solvents, e.g., isobutanol, suggested therein, a protective coating composition is provided which adheres to cast acrylics without the necessity of a primer. The contents of the foregoing patents and applications are incorporated hereby by reference.

Now, surprisingly, it has been found that the need for special solvents and formula moidification can be eliminated, by employing a step comprising a wash coat of glacial acetic acid shortly prior to applying the final hard coat composition. As will be seen hereafter, the glacial acetic acid can be applied by common techniques such as flowcoating and dipcoating. The acid concentration and drainage time are important to the adhesion. Using acetic acid diluted with isopropanol reduces the ultimate abrasion resistance and acclerates delamination under RS Sunlamp exposure. The drainage time should be 2 to 5 minutes, since longer intervals between washing and coating cause poorer adhesion. Thus, primerless adhesion of the conventional silicone hard coat compositions to cast poly(methyl methacrylate) sheet is obtained according to this invention using simple procedures and without harm to the desired final properties, high abrasion resistance and excellent optical clarity.

SUMMARY OF THE INVENTION

Accordingly, it is one object of the present invention to provide an improved method for silicone resin coating of unprimed cast acrylic substrates.

This and other objects are accomplished hereby by the steps comprising:

(i) applying to an unprimed cast acrylic substrate a wash coating of glacial acetic acid and draining said wash coating for from 2 to 5 minutes; and (ii) thereafter applying a coating composition comprising a dispersion of colloidal silica in an aliphatic alcohol-water solution of the partial condensate of a silanol of the formula $RSi(OH)_3$, wherein R is selcted from the group consisting of alkyl having from 1 to 3 carbon atoms and aryl, at least 70 weight percent of the silanol being $CH_3Si(OH)_3$, said composition containing 10 to 40% solids, said solids consisting essentially of 10 to 70 weight % colloidal silica and 30 to 90 weight % of the partial condensate and wherein said composition has a pH of from 7.1 to about 7.8.

DETAILED DESCRIPTION OF THE INVENTION

The coating compositions used in this invention are prepared by hydrolyzing an alkyltrialkoxysilane or aryltrialkoxysilane of the formula $RSi(OR)_3$, wherein R is alkyl of from 1 to 3 carbon atoms or aryl, such as phenyl, in an aqueous dispersion of colloidal silica, diluting the solids content of the resultant hydrolysis mixture with a solvent comprising an aliphatic alcohol or a mixture threof. In preferred embodiments a polysiloxane polyether copolymer will be admixed with the resultant product to produce improvements in flow control and to minimize dirtmarks.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purposes of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silicas having an alkali content of less than 0.35% (calculated as $Na_2O$) are preferred. Moreover, colloidal silicas having average particle size of from 10 to 30 millimicrons are also preferred. A particularly preferred one for the purposes herein is known as Ludox LS, sold by DuPont Company.

To produce a coating composition, the aqueous colloidal silica dispersion is added to a solution of a small amount of alkyltriacetoxysilane in alkyltrialkoxysilane or aryltrialkoxysilane. The temperature of the reacting mixture is maintained at about 20° C. to 30° and preferably below 25° C. It has been found that in about six to eight hours sufficient trialkoxysilane or aryltrialkoxysilane has reacted to reduce the initial two-phase liquid mixture to one liquid phase in which the now treated silica (i.e., treated by its admixture with the trialkoxysilane or aryltrialkoxysilane) is dispersed. In general, the hydrolysis reaction is allowed to continue for a total of about 16 hours to 48 hours, depending upon the desired viscosity of the final product. The more time the hydrolysis reaction is permitted to continue, the higher will be the viscosity of the product. Aliphatic alcohol is generated in situ during hydrolysis and such becomes a part of the total organic solvent medium employed in the compositions of this invention.

After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol).

The solids content of the coating composition of this invention is generally preferred to be in the range of from about 18 to 25%, most preferably about 20%, by weight of the total composition. The pH of the resultant coating composition is in the range of from about 7.1 to about 7.8, preferably around about 7.2 If necessary, dilute base, such as ammonium hydroxide or weak acid, such as acetic acid, may be added to the composition to adjust the final pH to this desired range.

The polysiloxane polyether copolymers, when used as flow control agents herein, may be added to the composition after the hydrolysis is completed. Preferably, however, these copolymers are added to the composition after the initial solids content has been diluted as described above. The polysiloxane polyether copolymer acts as a flow control agent and thereby prevents flowmarks, dirtmarks, and the like, on the surface of the substrate to which the coating is subsequently applied. The polysiloxane polyether copolymer is employed in amounts of from about 2.5 to about 15% by weight of the total solids of the composition. Most advantageous results are achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive has been found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the aqueous-organic cosolvent system of the compositions herein and becomes a permanent part of the cured coating, not removed by washing, even with soap and water.

More specifically, some of the polysiloxane polyether copolymers useful in the practice of the invention herein are liquid organopolysiloxane copolymers having the formula:

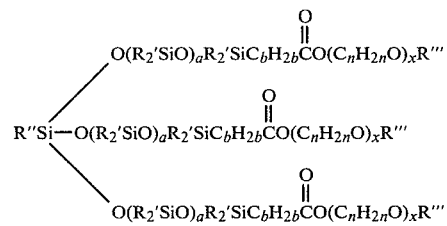

where R' and R" are monovalent hydrocarbon radicals; R''' is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R' and R" in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl e.g., benzyl phenylethyl, etc., alkenyl and cycloalkenyl, e.g., vinyl, allyl, cyclohexanyl, etc.; and halogenated radicals of the aforementioned type, e.g., chloromethyl, chlorophenyl, dibromophenyl, etc. R''' is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula ' is preferably methyl, R' is preferably methyl, R''' is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141 (General Electric Company), BYK-300, sold by Mallinckrodt, L-538 and L-540, sold by Union Carbide, and DC-190, sold by Dow Corning.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1-6 carbon atoms can be used, alkyl groups having from 1 to 3 carbon atoms being preferred. Methyltriacetoxysilane is most preferred.

The silanetriols, RSi(OH)$_3$, hereinabove mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which upon hydrolysis generate the silanetriols and further liberate the corresponding alcohol. Thus the aliphatic alcohol content present in the final coating compositions of this invention is provided in this manner. Of course, if a mixture of trialkoxysilanes is employed, a mixture of different silanetriols, as well as different alcohols, is generated. Upon the generation of the silanetriol or mixture of silanetriols in the basic aqueous medium, condensation of the hydroxyl substitutents to form

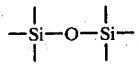

bonding occurs. This condensation takes place over a period of time and is not exhaustive but rather the siloxane retains an appreciable quantity of silicon-bonded hydroxyl groups which render the polymer soluble in the aqueous-organic solvent medium employed herein. This partial condensate can be characterized as a siloxanol polymer having at least one silicon-bonded hydroxyl group per every three

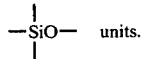

The non-volatile solids portion of the coating composition herein is a mixture of colloidal silica and the partial condensate (or siloxanol) of a silanol. The major portion or all of the partial condensate or siloxanol is obtained from the condensation of CH$_3$Si(OH)$_3$ and, depending upon the input of ingredients to the hydrolysis reaction, minor portions of partial condensate can be obtained, for example, from the condensation of CH$_3$Si(OH)$_3$ with C$_2$H$_5$Si(OH)$_3$ or C$_3$H$_7$Si(OH)$_3$; CH$_3$Si(OH)$_3$ with C$_6$H$_5$Si(OH)$_3$, or even mixtures of the foregoing. For optimum results in the cured coating, it is preferred to use all methyltrimethoxysilane (thus generating all monomethylsilanetriol) in preparing the coating composition herein. In the preferred coating composition herein the partial condensate is present in an amount of from about 55 to 75 weight percent of the total solids in the aqueous-organic solvent medium. The alcohol portion (generated in situ) of the total organic solvent medium comprised from about 10% to about 30% by weight.

The coating compositions of this invention will cure on a substrate at temperatures of, for example, 90° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also comtemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylic catalysts will be generated in situ during the hydrolysis reaction herein.

The amount of curing catalyst can be varied within a wide range, depending upon the desired curing condition. However, in general, catalyst in the amounts of from about 0.05 to about 0.5 weight percent, preferably about 0.1 weight percent, of the composition can be used. Compositions containing catalysts in these amounts can be cured on a solid subtrate in a relatively short time at temperature in the range of from about 75°–150° C. to provide a transparent abrasion resistant surface coating.

The coating composition of the present invention can be applied to unprimed, glacial acetic acid wash-coated cast acrylic substrates by conventional methods, such as flowing or dipping, to form a continuous surface film. Substrates which are especially contemplated herein are transparent cast acrylics. More particularly, the cast acrylic polymers, comprise poly(methylmethacrylate), especially transparent cast films thereof.

As has been mentioned the wash coat of glacial acetic acid, an item of commerce, is applied prior to the final coat. This can be done by dipping or flowcoating. It is preferred to drain-dry, but only from about 2 to about 5 minutes. If a longer time is permitted, there is an adverse effect on adhesion. So too, shorter times also cause adverse effects.

The coating composition will air-dry to a tack-free condition, but heating in the range of 75° C. to 200° C. is necessary to obtain condensation of residual silanols in the partial condensate. This final cure results in the formation of silsesquioxane (RSiO$_{3/2}$O). In the finished cured coating the ratio of RSiO$_{3/2}$ units to SiO$_2$ will range from about 0.43 to about 9.0, preferably 1 to 3. A cured coating having a ratio of RSiO$_{3/2}$ to SiO$_2$, when R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 22.1 parts by weight of Ludox LS, silica sol (aqueous dispersion of colloidal silica, average particle size of 12 millimicrons, pH of 8.2 sold by DuPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to 20% solids with isobutanol. One gram (5% solids) of SF-1066 (polysiloxane polyether copolymer, sold by GE) is thoroughly mixed with 99 grams of the resultant composition. The final composition has a pH of higher than 7.2.

A 6"×8" panel of Plexiglas S (a modified poly(methylmethacrylate)) is flowcoated with glacial acetic acid and permitted to drain for 2-5 minutes. The product is applied to the primed panel of cast acrylic sheet by flow coating, air dried for 30 minutes, and cured in an oven at 90° C. for 4 hours.

The coated panels are clear and colorless. Taber abrasion for 500 cycles (500 g load and C S-10 F wheels) affords a change in haze of only 2%. The coating passes initial scribed adhesion (three pulls with 3 M Scotch 710 tape), and maintains scribed adhesion for more than 1000 hours in the QUV Accelerated Weather Test and then for more than 14 days in a 65° C. water soak test.

Without the glacial acetic acid wash coat, there is no initial adhesion on this substrate.

Obviously, other modifications and variations of the present invention are possible in light of the above teachings. It is therefore to be understood that changes may be made in the particular embodiments described above which are within the full intended scope of the invention as defined in the appended claims.

What is claimed and desired to be secured by Letters Patent is:

1. In process for forming an adherent, abrasion-resistant coating on unprimed cast acrylic substrate, the steps comprising:

(i) applying to said substrate a wash coating of glacial acetic acid and draining said wash coating for from 2 to 5 minutes.

(ii) thereafter applying a coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 40% solids, said solids consisting essentially of 10 to 70 weight % colloidal silica and 30 to 90 weight % of the partial condensate and wherein said composition has a pH of from 7.1 to about 7.8.

2. A process is defined in claim 1 wherein said composition also includes a small amount of a polysiloxane polyether copolymer.

3. A process defined in claim 1 wherein said coating is cured on the substrate.

4. A process as defined in claim 1 wherein said aqueous coating composition contains about 20% solids, the partial condensate is of $CH_3Si(OH)_3$ and the aliphatic alcohol is methanol.

5. A process as defined in claim 1 wherein the pH is from about 7.2 to about 7.8.

6. A process as defined in claim 2 wherein said polysiloxane polyether copolymer is present in an amount of from about 2.5 to about 15% by weight of the total solids of the composition.

7. A process as defined in claim 1 wherein said cast acrylic substrate is transparent.

* * * * *